United States Patent
Williams et al.

(10) Patent No.: US 10,844,742 B2
(45) Date of Patent: Nov. 24, 2020

(54) HEAT SHIELD

(71) Applicant: BorgWarner Inc., Auburn Hills, MI (US)

(72) Inventors: Jonathan Williams, Fletcher, NC (US); Raj Chandramohanan, Fletcher, NC (US); Robert Race, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 835 days.

(21) Appl. No.: 15/131,788

(22) Filed: Apr. 18, 2016

(65) Prior Publication Data
US 2017/0298761 A1    Oct. 19, 2017

(51) Int. Cl.
| | |
|---|---|
| F02B 33/40 | (2006.01) |
| F02B 37/00 | (2006.01) |
| F01D 5/02 | (2006.01) |
| F01D 25/24 | (2006.01) |
| F01D 25/16 | (2006.01) |
| F01D 25/08 | (2006.01) |
| F01D 25/14 | (2006.01) |

(52) U.S. Cl.
CPC .............. *F01D 25/08* (2013.01); *F01D 5/02* (2013.01); *F01D 25/162* (2013.01); *F01D 25/24* (2013.01); *F02B 33/40* (2013.01); *F02B 37/00* (2013.01); *F05D 2220/40* (2013.01); *F05D 2230/60* (2013.01)

(58) Field of Classification Search
CPC ........ F01D 25/08; F01D 25/162; F01D 25/24; F01D 25/243; F16C 2360/24
See application file for complete search history.

(56) References Cited

U.S. PATENT DOCUMENTS

| | | | |
|---|---|---|---|
| 2,680,001 A | 6/1954 | Batt | |
| 5,087,176 A * | 2/1992 | Wieland | .................. F01D 5/025 415/177 |
| 5,855,112 A | 1/1999 | Bannai et al. | |
| 7,946,809 B2 | 5/2011 | Meier et al. | |
| 7,988,426 B2 * | 8/2011 | Elpern | .................. F01D 25/125 415/112 |
| 9,163,557 B2 | 10/2015 | Blümmel et al. | |

(Continued)

FOREIGN PATENT DOCUMENTS

| | | | |
|---|---|---|---|
| WO | WO-2014/0164189 A1 | 10/2014 | |
| WO | WO-2015/051891 A1 | 4/2015 | |

*Primary Examiner* — Igor Kershteyn
*Assistant Examiner* — John S Hunter, Jr.
(74) *Attorney, Agent, or Firm* — Miller, Matthias & Hull LLP

(57) ABSTRACT

A heat shield (100) and method for assembling such is disclosed. The heat shield (100) may comprise an outer wall (122) and an inner wall (124). The outer wall (122) includes a first member (130), a flange (132) extending outward from the first member (130) and a first inner edge (134). The first member (130) extends from the flange (132) to the first inner edge (134). The inner wall (124) includes a second member (140), a rim (142) extending outward from the second member (140) and a second inner edge (144). The second member (140) extends from the rim (142) to the second inner edge (144). The inner wall (124) is spaced apart from the outer wall (122), the first and second edges form an air gap (146) between them, and the inner wall (124) and the outer wall (122) form a cavity (148).

14 Claims, 17 Drawing Sheets

(56) References Cited

U.S. PATENT DOCUMENTS

| | | | |
|---|---|---|---|
| 9,212,700 B1* | 12/2015 | Bucking | F16C 37/007 |
| 2011/0014036 A1 | 1/2011 | Boening et al. | |
| 2012/0114469 A1 | 5/2012 | Glitz et al. | |
| 2014/0193244 A1 | 7/2014 | Koerner et al. | |
| 2015/0252689 A1 | 9/2015 | Burmester et al. | |
| 2016/0290163 A1* | 10/2016 | Yokoyama | F01D 25/24 |

* cited by examiner

HEAT SHIELD

TECHNICAL FIELD

The present disclosure generally relates to a heat shield, and more specifically to a heat shield for a turbocharger.

BACKGROUND

Turbochargers are used to enhance the performance of internal combustion engines. They are a type of forced induction system which delivers air to the engine intake at a greater density than achieved in a typical aspirated configuration for such internal combustion engine. They are typically centrifugal compressors driven by exhaust-driven turbines. Exhaust gas from the engine drives the turbine to drive an impeller of the compressor. The compressor draws in ambient air, compresses the air, and then supplies this compressed air to the engine. In this manner, the engine may have improved fuel economy, reduced emissions, and high power and torque.

The exhaust temperature at the inlet to the turbine may reach temperatures in excess of 800° C. in some applications. As such, these high temperatures may penetrate the adjacent bearing housing and may result in a decrease to the viscosity of the bearing lubrication oil or fluid. This may result in undesirable effects to the operation of the turbocharger.

SUMMARY OF THE DISCLOSURE

In accordance with one aspect of the disclosure, a heat shield is disclosed. The heat shield may comprise an outer wall defining a first aperture about an axis, and an inner wall defining a second aperture about the axis. The outer wall includes a first member, a flange extending outward from the first member and a first inner edge adjacent to the first aperture. The first member extends from the flange to the first inner edge. The inner wall includes a second member, a rim extending outward from the second member and a second inner edge adjacent to the second aperture. The second member extends from the rim to the second inner edge. The inner wall is spaced apart from the outer wall, the first and second inner edges form an air gap between them, and the inner wall and the outer wall form a cavity that extends from the rim to the air gap. The air gap is an entrance to the cavity.

In accordance with another aspect of the disclosure, a method of assembling a heat shield in a turbocharger is disclosed. The method may comprise positioning an inner wall over a chamber in a bearing housing, the inner wall including an second member and a rim extending outward from the second member; and mounting an outer wall between the bearing housing and a turbine housing. The outer wall defines a first aperture. The outer wall includes a first member, a flange extending outward from the first member, and a first inner edge adjacent to the first aperture. The first member extends from the flange to the first inner edge. The outer wall is suspended over the inner wall. The inner wall and the outer wall form a cavity. There is an air gap between the inner and outer walls proximal to the first aperture. The air gap an entrance to the cavity.

In accordance with a further aspect of the disclosure a turbocharger is disclosed. The turbocharger may comprise a turbine housing, a turbine wheel disposed in the turbine housing and configured to rotate about an axis, a bearing housing adjacent to the turbine housing, and a heat shield disposed between the turbine housing and the bearing housing. The heat shield including an outer wall defining a first aperture about the axis and an inner wall defining a second aperture about the axis. The outer wall includes a first member, a flange extending outward from the first member and a first inner edge adjacent to the first aperture. The first member extends from the flange to the first inner edge. The inner wall includes a second member, a rim extending outward from the second member and a second inner edge adjacent to the second aperture. The second member extends from the rim to the second inner edge. The inner wall is spaced apart from the outer wall, the first and second inner edges form an air gap between them, and the inner wall and the outer wall form a cavity that extends from the rim to the air gap, the air gap an entrance to the cavity.

Figure 1:
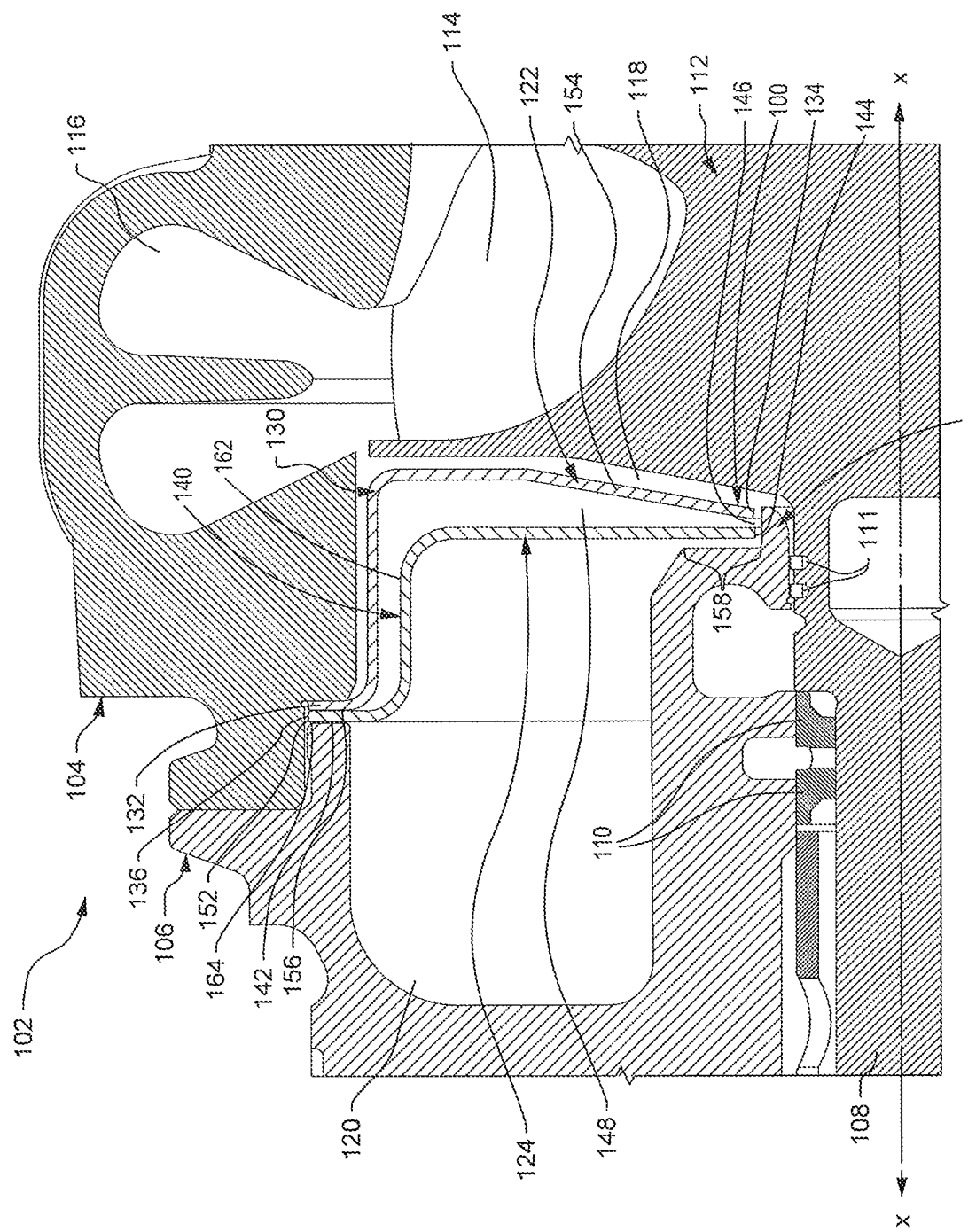
FIG. 1 is a schematic cross sectional view of a portion of one exemplary embodiment of an exhaust-gas turbocharger including a heat shield, turbine housing, turbine wheel and a bearing housing.
Figure 2:
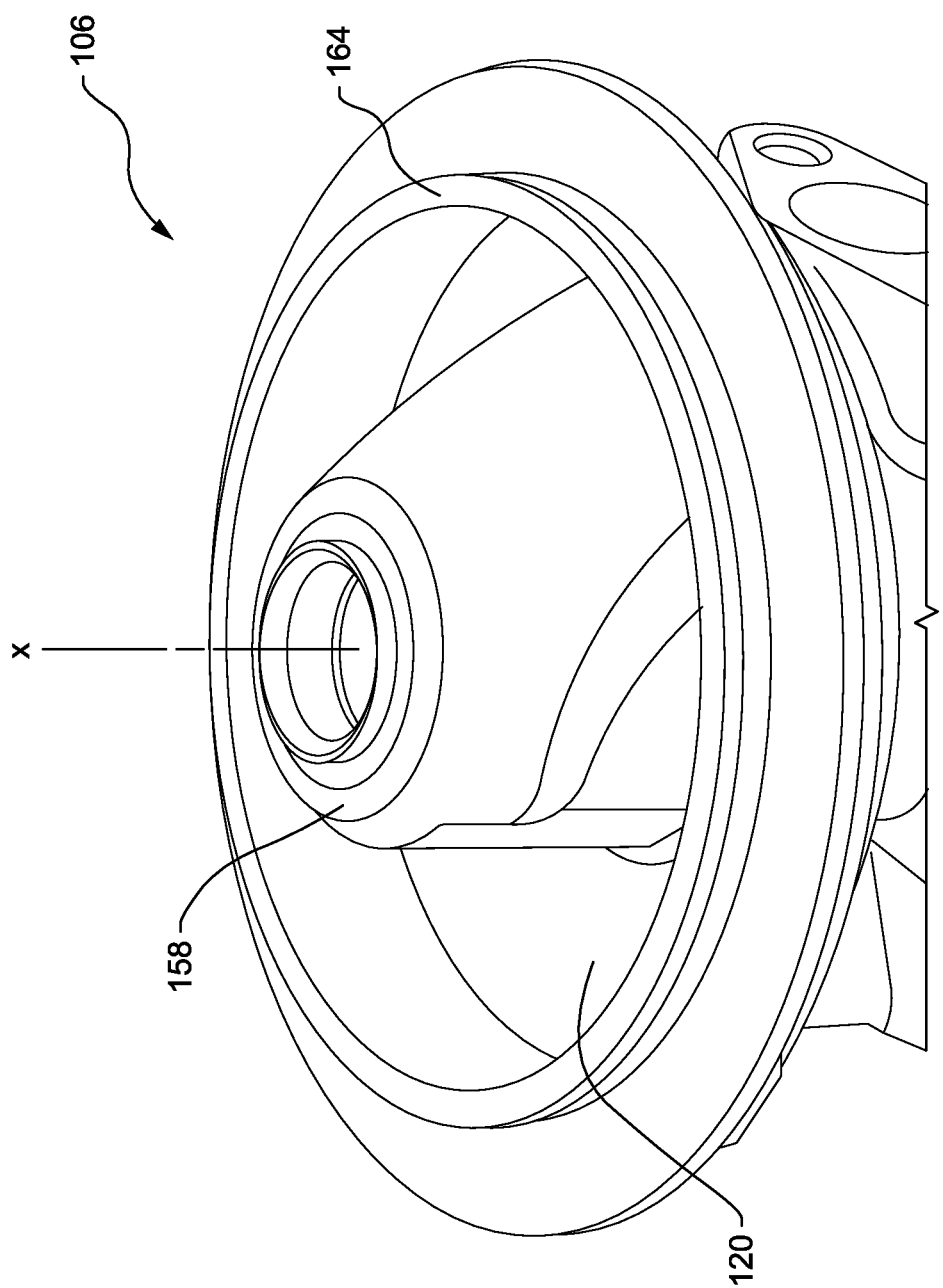
FIG. 2 is a perspective view of the exemplary bearing housing of FIG. 1.

While the following detailed description is given with respect to certain illustrative embodiments, it should be understood that the drawings are not necessarily to scale and the disclosed embodiments are sometimes illustrated diagrammatically and in partial view. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as equivalents thereto.

DETAILED DESCRIPTION

Referring now to FIGS. 1-17, this disclosure describes exemplary embodiments of a heat shield 100 for a turbocharger 102. The exemplary embodiments of the heat shield 100 are described relative to an exemplary turbocharger 102 (FIGS. 1, 6, 7, 9, 12 and 16). In the exemplary embodiment, the turbocharger 102 includes a turbine housing 104, a bearing housing 106, a shaft 108, bearings 110, a turbine wheel 112 having blades 114, and a compressor (not shown).

The turbine housing 104 is secured or mounted to the bearing housing 106. The shaft 108 is rotatably mounted, via the bearings 110 (e.g., journal bearings), in the bearing housing 106. Piston rings 111 are disposed between the shaft 108 and the bearing housing 106. The turbine wheel 112 is mounted on and rotates with the shaft 108 about an X-axis. The turbine housing 104 includes an inlet 116 to the turbine wheel 112. The turbine wheel 112 is spaced apart from the heat shield 100. The turbocharger 102 further includes an exhaust channel 118. The exhaust channel 118 may be defined by the heat shield 100 and the turbine wheel 112. More specifically, the exhaust channel 118 may be defined by an outer wall 122 of the heat shield 100 and the turbine wheel 112. The bearing housing 106 includes a chamber 120 (FIGS. 1-2, 6-7, 9, 12, 13 and 16) and an outer shoulder 164, and may include an inner shoulder 158. The chamber 120 may be disposed between the inner shoulder 158 and the outer shoulder 164. In some embodiments, the chamber 120 may be generally annular in shape.

The heat shield 100 (FIGS. 1, 6, 7, 9, 12 and 16) comprises the outer wall 122 and an inner wall 124. The outer wall 122 defines a first aperture 172 disposed about the X-axis. While the first aperture 172 is shown as circular in the figures, it may be any appropriate shape. The major diameter (longest width) of the first aperture 172 (FIG. 4) may be referred to the first inner diameter 128 of the outer wall 122. The major diameter (longest width across) of the outer wall 122 may be referred to as a first outer diameter 126. While the outer wall 122 is shown as generally annular, it is not limited to this shape and may be any other appropriate shape. The outer wall 122 may form a side of the exhaust channel 118 (FIGS. 1, 6, 7, 9 and 12).

Figure 4:
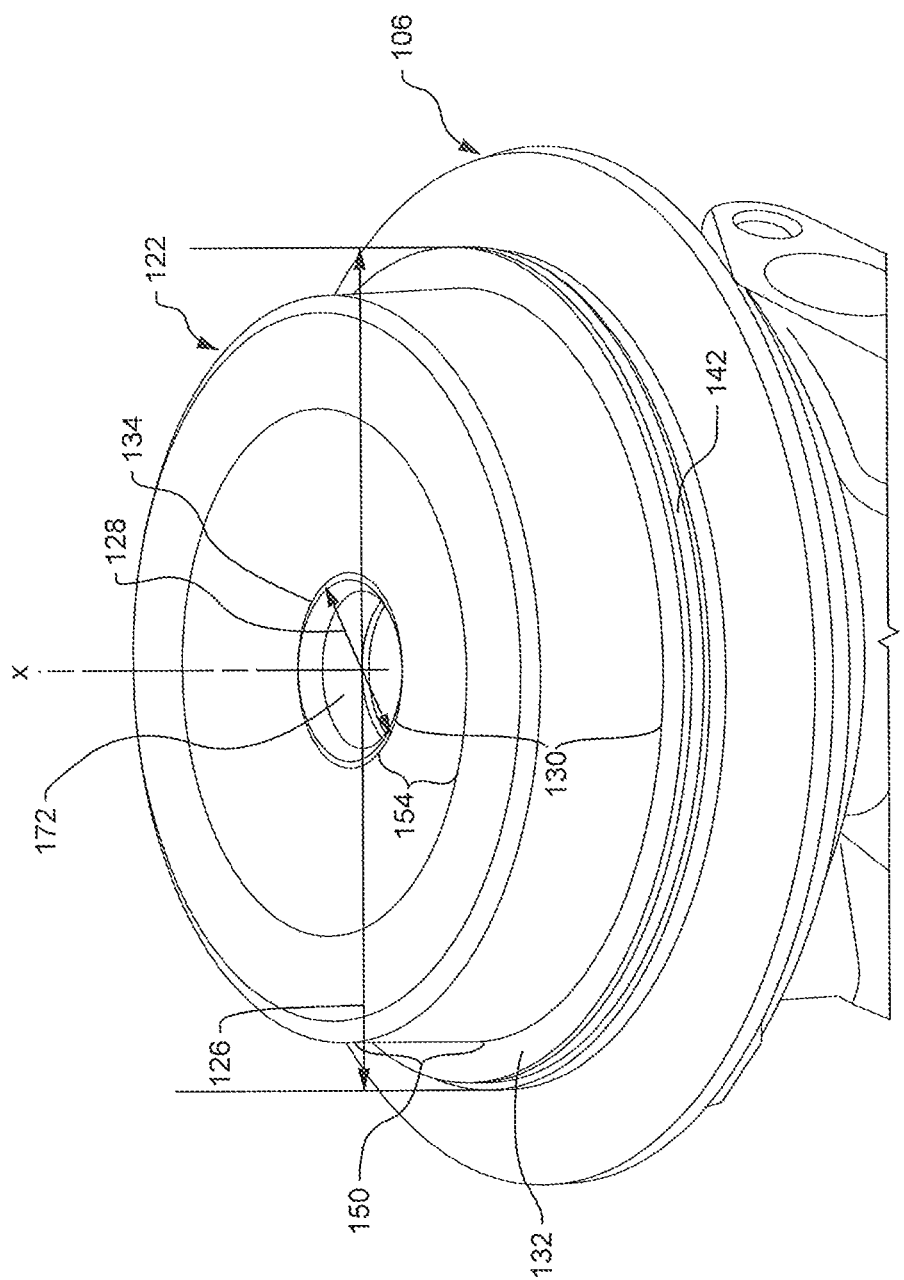
FIG. 4 is a perspective view illustrating an outer wall of the heat shield of FIG. 1.
Figure 5:
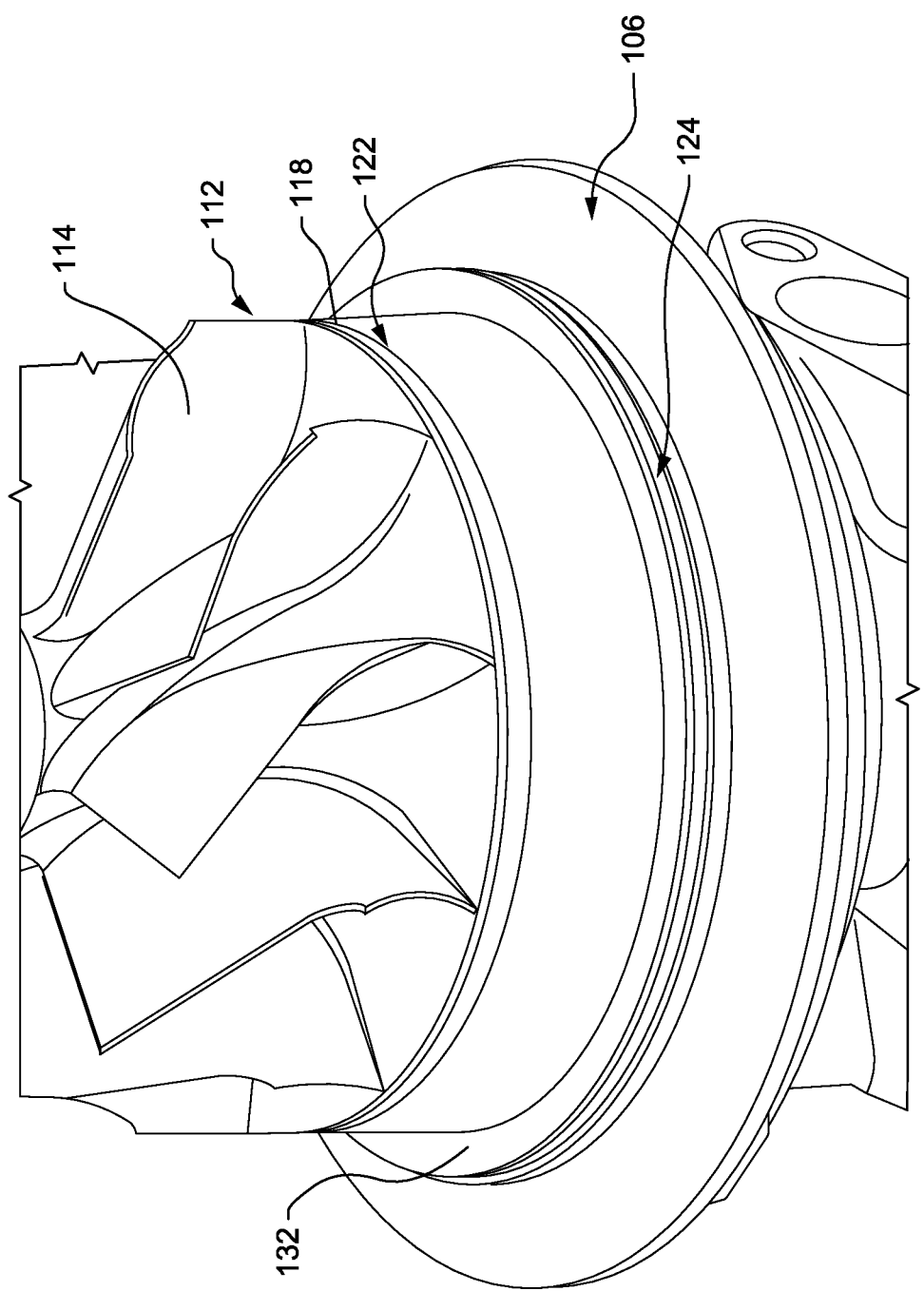
FIG. 5 is a perspective view illustrating the heat shield and turbine of FIG. 1.

The outer wall 122 includes a first member 130 (FIGS. 1, 4, 6, 7, 9, 12 and 16), a flange 132 that extends outward from the first member 130 and a first inner edge 134 that is adjacent to the first aperture 172. The first member 130 extends from the flange 132 to the first inner edge 134. In some embodiments, the first member 130 may include one or more steps. The outer wall 122 also includes a first outer edge 150 (FIG. 4). The outer wall 122 is spaced apart from the bearing housing 106 at the first inner edge 134 (FIGS. 1, 4, 6, 7, 9, 12 and 16). The outer wall is indirectly adjacent (the exhaust channel 118 is between) to the turbine wheel 112 (FIGS. 1, 5-6, 7, 9, 12 and 16).

Figure 3:
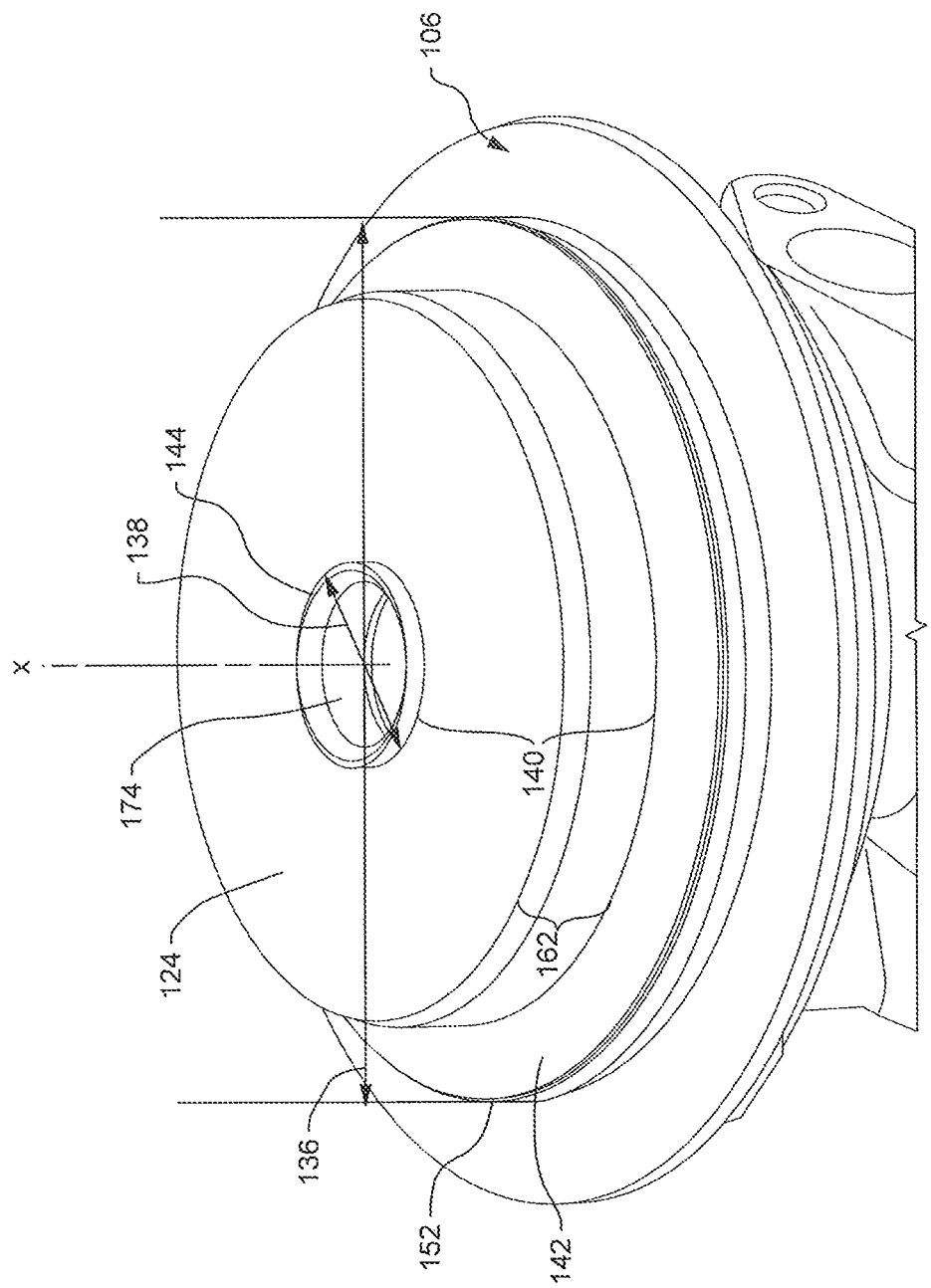
FIG. 3 is a perspective view illustrating an inner wall of the heat shield of FIG. 1 disposed on the bearing housing of FIGS. 1-2.

The inner wall 124 defines a second aperture 174 disposed about the X-axis. The second aperture 174 may be coaxial with the first aperture 172. While the second aperture 174 (FIG. 3) is shown as circular in the figures, it may be any appropriate shape. The major diameter (longest width) of the second aperture 174 may be referred to the second inner diameter 138 of the inner wall 124. The major diameter (longest width across) of the inner wall 124 may be referred to as a second outer diameter 136 (FIG. 3). While the inner wall 124 is shown as generally annular, it is not limited to this shape and may be any other appropriate shape. In some embodiments (e.g., FIGS. 1, 6, 7 and 16), the second outer diameter 136 may be the same length as the first outer diameter 126 (FIG. 4) of the outer wall 122. In other embodiments (e.g., FIGS. 9 and 12), the second outer diameter 136 may be shorter than the first outer diameter 126 of the outer wall 122. In some embodiments (e.g., FIGS. 1, 6, 7, 12 and 16), the second inner diameter 138 (FIG. 3) may be the same length as the first inner diameter 128 (FIG. 4) of the outer wall 122. In other embodiments (e.g., FIG. 9), the second inner diameter 138 may be shorter than the first inner diameter 128 of the outer wall 122. In some embodiments, the inner wall 124 (FIGS. 1, 6, 7, 9, 12 and 16) may be configured to be nested in the outer wall 122. In other embodiments, the inner wall 124 may not be nested in the outer wall 122.

The inner wall 124 includes an second member 140 (FIGS. 1, 3, 6, 7, 9, 12 and 16), a rim 142 extending outward from the second member 140 and a second inner edge 144 adjacent to the second aperture 174 (FIG. 3). In some embodiments, the rim 142 may be annular in shape. In some embodiments, but not necessarily all embodiments, the rim 142 may extend continuously around the first member 130 and the surface may be unbroken or free of cutouts that define one or more strips or flaps. In other embodiments, the rim 142 may include a plurality of spaced apart strips. The second member 140 extends from the rim 142 to the second inner edge 144. The second member includes a leg 162. When installed in the turbocharger 102, the inner wall 124 is spaced apart from the outer wall 122 (FIGS. 1, 6, 7, 9, 12 and 16) such that the first and second inner edges 134, 144 form an air gap 146 between them, and the inner wall 124 and the outer wall 122 form a cavity 148 that extends from the rim 142 to the air (exhaust or the like) gap 146. The air gap 146 is an entrance to the cavity 148. The inner wall 124 also includes a second outer edge 152. In some embodiments, the inner wall 124 may be spaced apart from the bearing housing 106 at the second inner edge 144 (see FIGS. 1, 6, 7, 12 and 16) and in other embodiments, the inner wall 124 (see FIG. 9) may be directly adjacent to (or flush with) the bearing housing 106 at the second inner edge 144.

In one embodiment, the first member 130 (FIG. 1) of the outer wall 122 may include a sloped portion 154 (see FIG. 1) proximal to the air gap 146 and the exhaust channel 118. The sloped portion 154 may slope toward the inner wall 124 and second inner edge 144. In some embodiments, such as the one shown in FIG. 1, the flange 132 may be disposed on the rim 142 at a contact area 156 and the flange may be configured to apply a contact force on the rim 142 in the contact area 156. In some embodiments, the flange 132 may be angled away from the rim 142 and outward from the contact area 156 toward the turbine housing 104. In an embodiment, a portion of the flange 132 that is directly adjacent to the first outer edge 150 may be in contact with the bearing housing 106 and may be spaced apart from the inner wall 124.

In some embodiments, the rim 142 may be disposed on the bearing housing 106 (e.g., the outer shoulder 164) proximal to the second outer edge 152. In one embodiment, the rim 142 of the inner wall 124 may be sandwiched between the outer shoulder 164 of the bearing housing 106 and the flange 132. The area of contact between the rim 142 and the flange 132 may be referred to herein as a contact area 156.

In the embodiment illustrated in FIG. 1, the mounting of the turbine housing 104 on the bearing housing 106, results in a force being applied to the flange 132 by the turbine housing 104 and, in turn, the flange 132 applies a force to the rim 142 of the inner wall 124 in the contact area 156. The force applied to the rim 142 suspends the inner wall 124 over the chamber 120 and above the inner shoulder 158 of the bearing housing 106. This force maintains the inner wall 124 position relative to the outer wall 122.

In the embodiment of FIG. 1, the flange 132 is configured in shape to apply an opposing force to the turbine housing 104. The net effect of the force applied by the turbine housing 104 and the opposing force applied by the flange 132 results in the outer wall 122 being suspended above the inner wall 124 (thereby creating the cavity 148 and air gap 146 between them), and results in the outer wall 122 and the inner wall 124 being held stationary and in the appropriate position in the turbocharger 102. It also results in the first inner edge 134 (of the outer wall 122) being held in a position that is spaced apart from the bearing housing 106.

Figure 6:
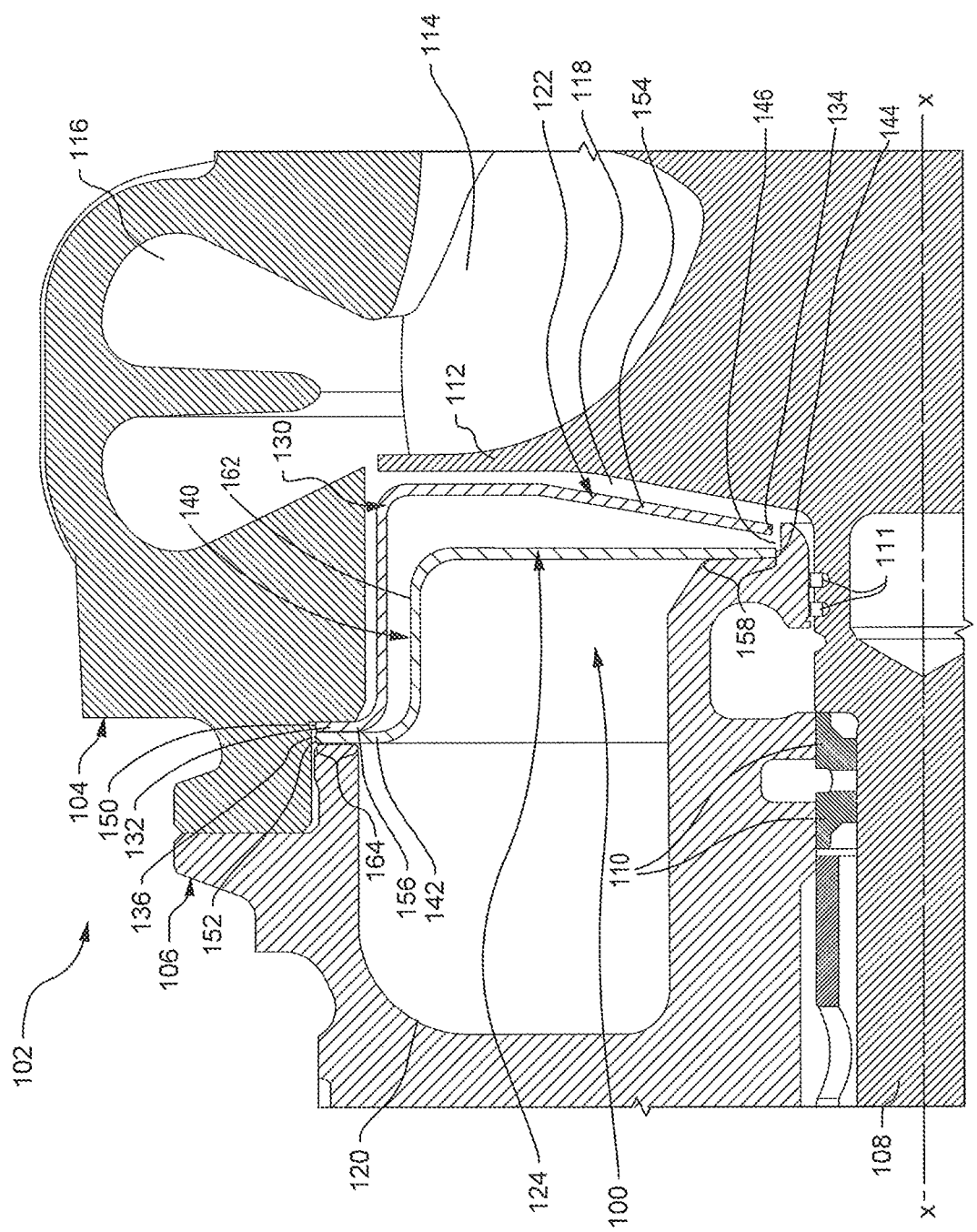
FIG. 6 is a schematic cross sectional view of a portion of another exemplary embodiment of the exhaust-gas turbocharger that includes an alternative embodiment of the heat shield.

FIG. 6 illustrates an alternative embodiment of the heat shield 100. The embodiment shown FIG. 6 is similar to that shown in FIG. 1, except that an alternative embodiment of the inner wall 124 is utilized and the chamber 120 is sealed by the inner wall 124. The inner wall 124 of FIG. 6 has a shorter leg 162 than the inner wall of FIG. 1. As a result, the inner wall 124 of FIG. 6 is disposed on top of and in contact with the inner shoulder 158 of the bearing housing 106.

Similar to the embodiment of FIG. 1, in the embodiment illustrated in FIG. 6, the mounting of the turbine housing 104 on the bearing housing 106, results in a force being applied to the flange 132 by the turbine housing 104 and, in turn, the flange 132 applies a force to the rim 142 of the inner wall 124 in the contact area 156. This force maintains the inner wall's 124 position relative to the outer wall 122. However, instead of suspending the inner wall 124 over the chamber 120 and above the inner shoulder 158, the force now results in the inner wall 124 being in sealing contact with the inner shoulder 158 and outer shoulder 164 of the bearing housing 106, thus sealing the chamber 120.

In the embodiment of FIG. 6, the flange 132 is configured in shape to apply an opposing force to the turbine housing 104. The net effect of the force applied by the turbine housing 104 and the opposing force applied by the flange 132 results in the outer wall 122 being suspended above the inner wall 124 (thereby creating the cavity 148 and air gap 146 between them), and results in the outer wall 122 and inner wall 124 being held stationary and in the appropriate position in the turbocharger 102. It also results in the first inner edge 134 (of the outer wall 122) being held in a position that is spaced apart from the bearing housing 106.

Figure 7:
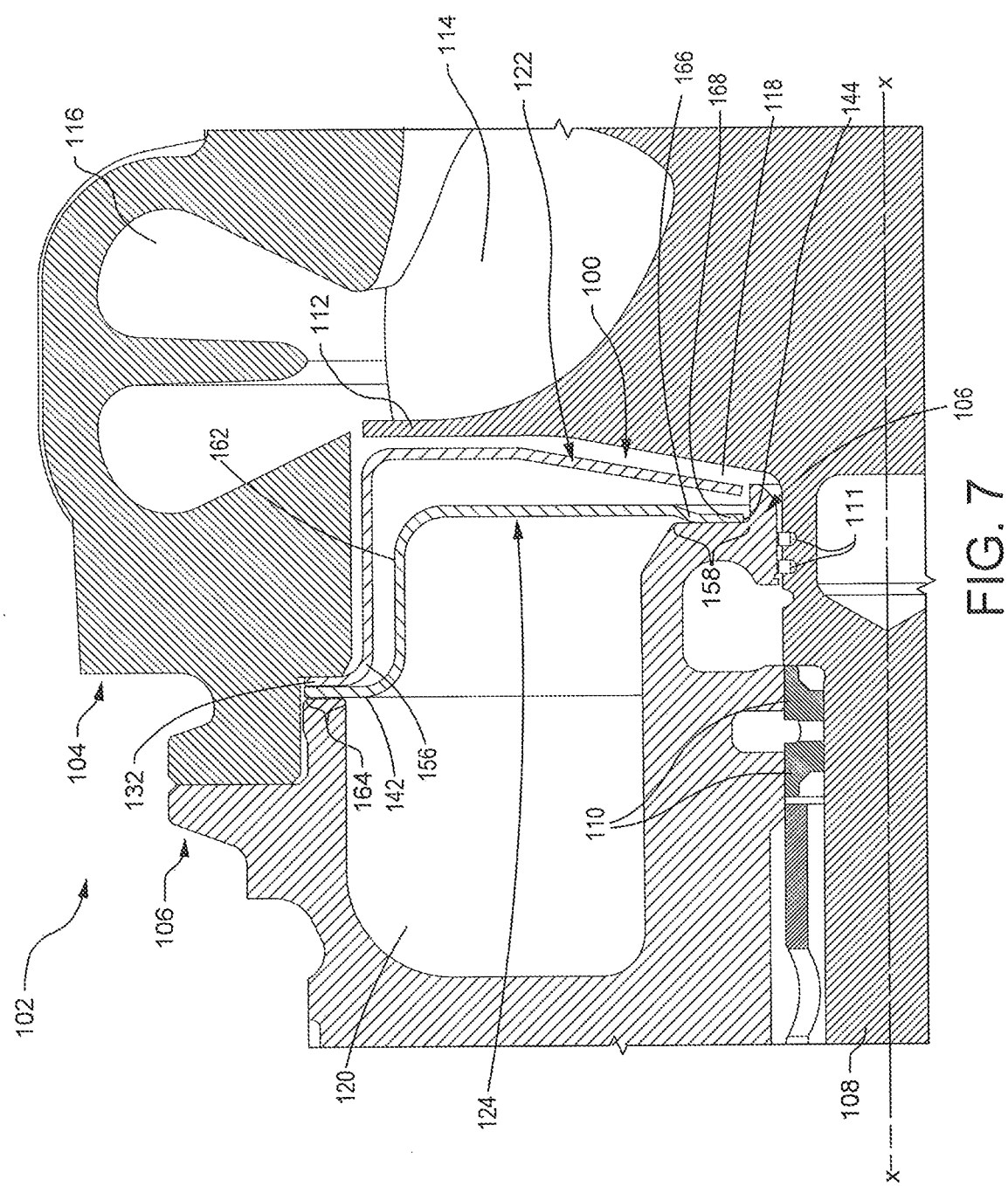
FIG. 7 is a schematic cross sectional view of a portion of another exemplary embodiment of the exhaust-gas turbocharger that includes another alternative embodiment of the inner wall.
Figure 8:
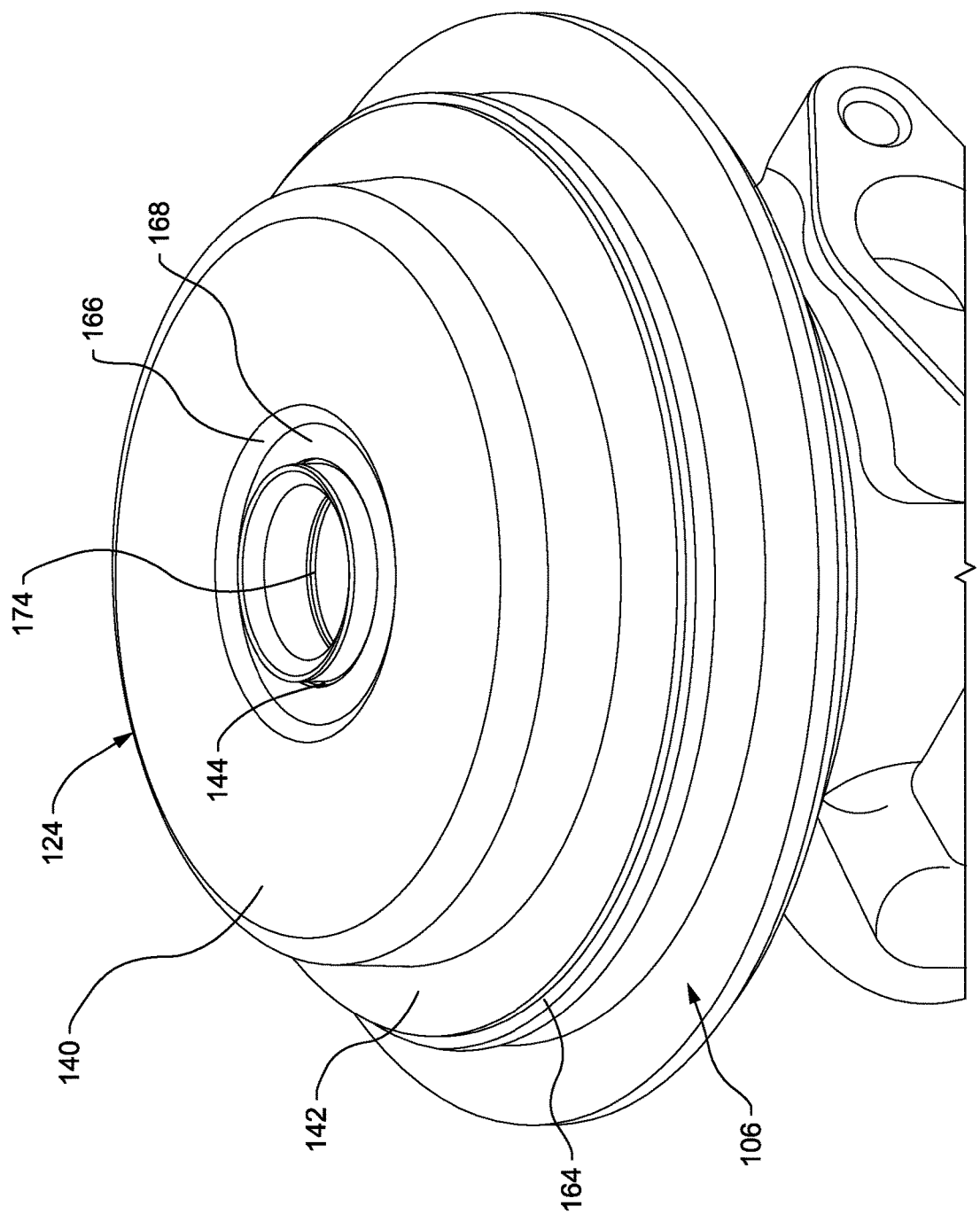
FIG. 8 is a perspective view illustrating the inner wall of the heat shield of FIG. 7.

FIG. 7 illustrates another alternative embodiment of the heat shield 100. The embodiment shown FIG. 7 is similar to that shown in FIG. 1, except that an alternative embodiment of the inner wall 124 is utilized. Similar to the embodiment of FIG. 6, the chamber 120 is sealed by the inner wall 124. The inner wall of FIG. 7 has an second member 140 that includes an inclined portion 166 (FIG. 8) and a lip 168. The inclined portion 166 slants toward the inner shoulder 158 (FIG. 7). The lip 168 is disposed between the second inner edge 144 and the inclined portion 166. The lip 168 may be generally flat and is disposed on the inner shoulder 158 of the bearing housing 106.

Similar to the embodiment of FIG. 1, in the embodiment illustrated in FIG. 7, the mounting of the turbine housing 104 on the bearing housing 106, results in a force being applied to the flange 132 by the turbine housing 104 and, in turn, the flange 132 applies a force to the rim 142 of the inner wall 124 in the contact area 156. This force maintains the inner wall's 124 position relative to the outer wall 122 and results in the inner wall 124 being in sealing contact with the inner shoulder 158 and outer shoulder 164 of the bearing housing 106, thus sealing the chamber 120 from exhaust gases.

In the embodiment of FIG. 7, the flange 132 is configured in shape to apply an opposing force to the turbine housing 104. The net effect of the force applied by the turbine housing 104 and the opposing force applied by the flange 132 results in the outer wall 122 being suspended above the inner wall 124 (thereby creating the cavity 148 and air gap 146 between them), and results in the outer wall 122 and the inner wall 124 being held stationary and in the appropriate position in the turbocharger 102. It also results in the first inner edge 134 (of the outer wall 122) being held in a position that is spaced apart from the bearing housing 106.

Figure 9:
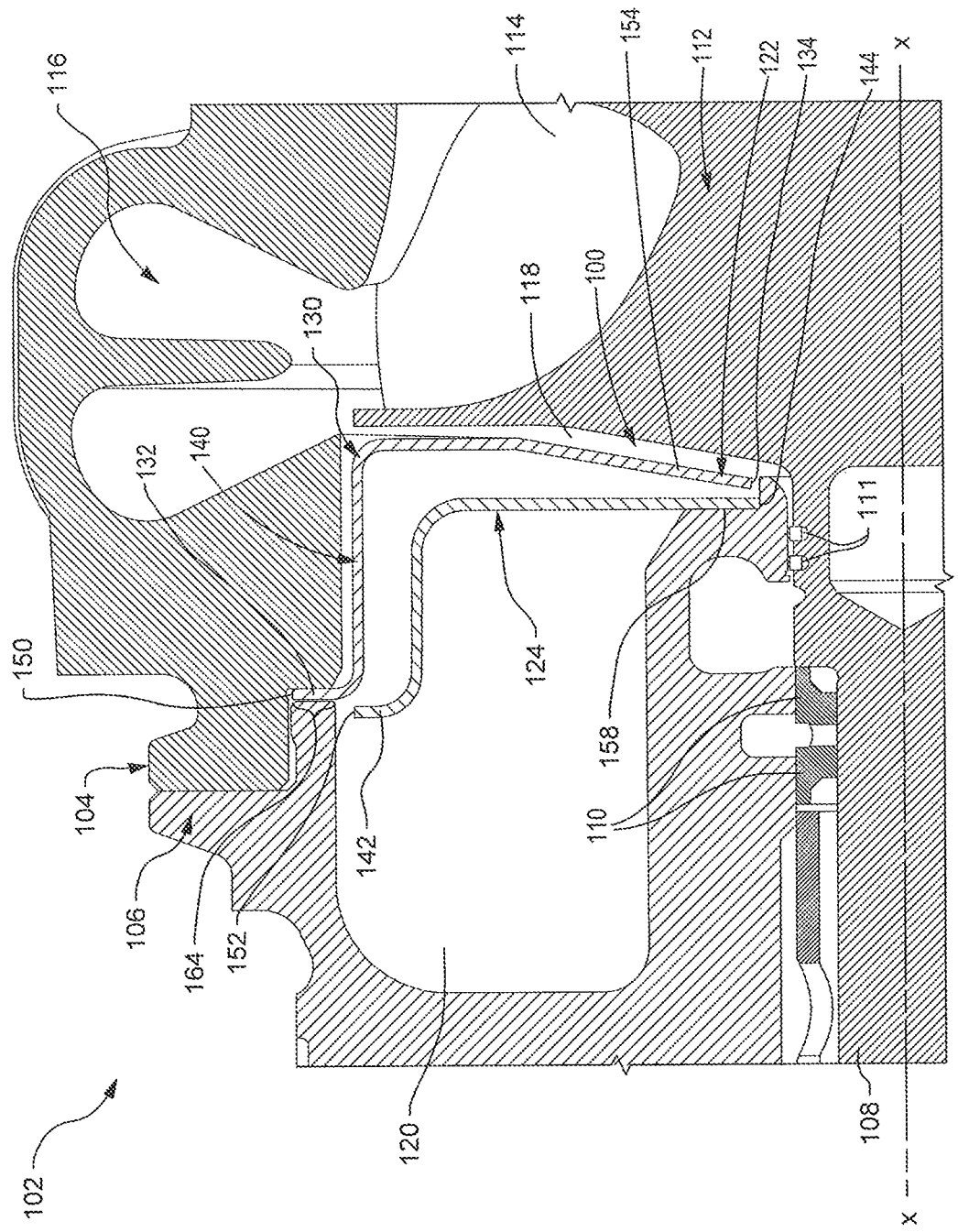
FIG. 9 is a schematic cross sectional view of a portion of another exemplary embodiment of the exhaust-gas turbocharger that includes an alternative embodiment of the heat shield.
Figure 10:
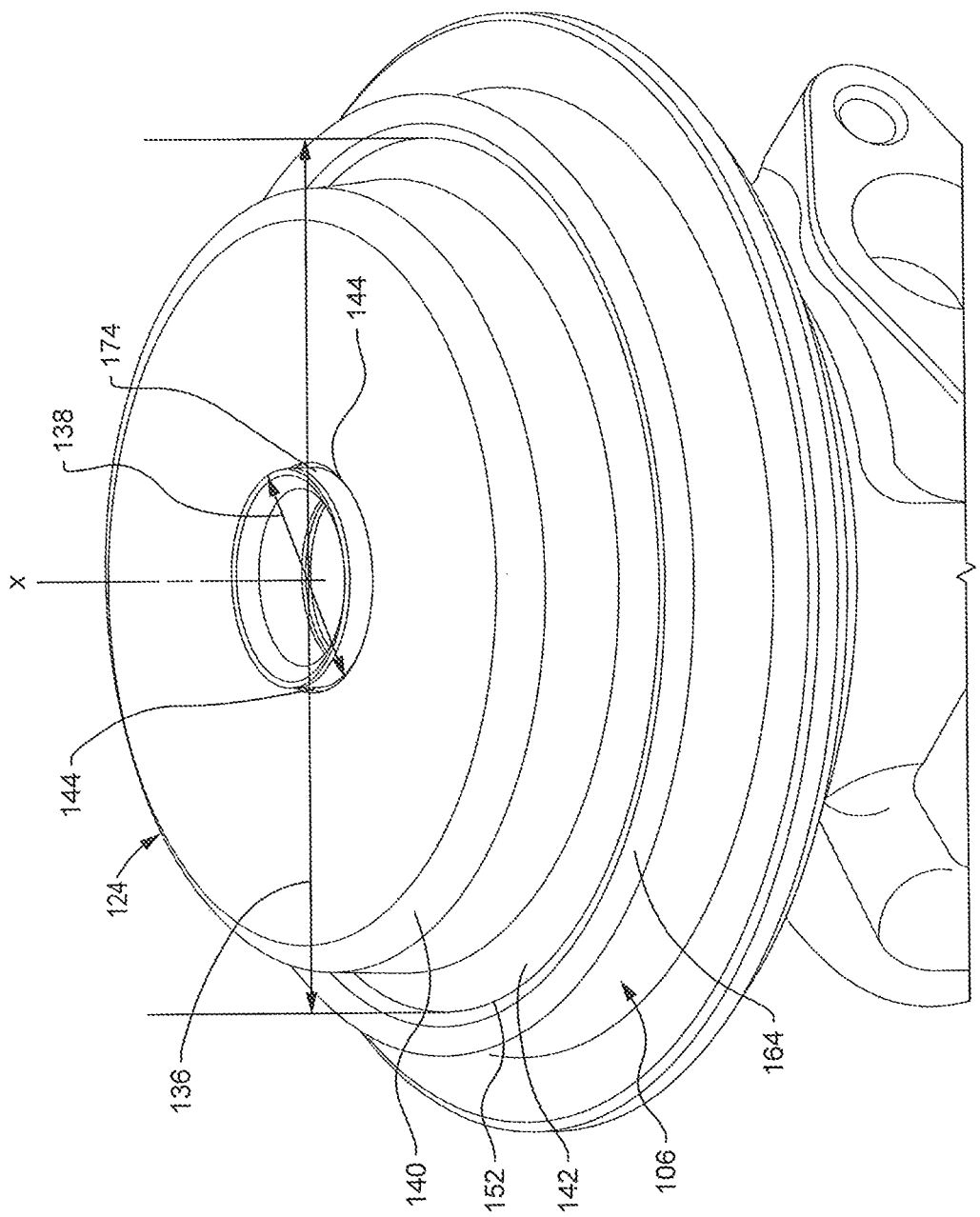
FIG. 10 is a perspective view illustrating the inner wall of the heat shield of FIG. 9.
Figure 11:
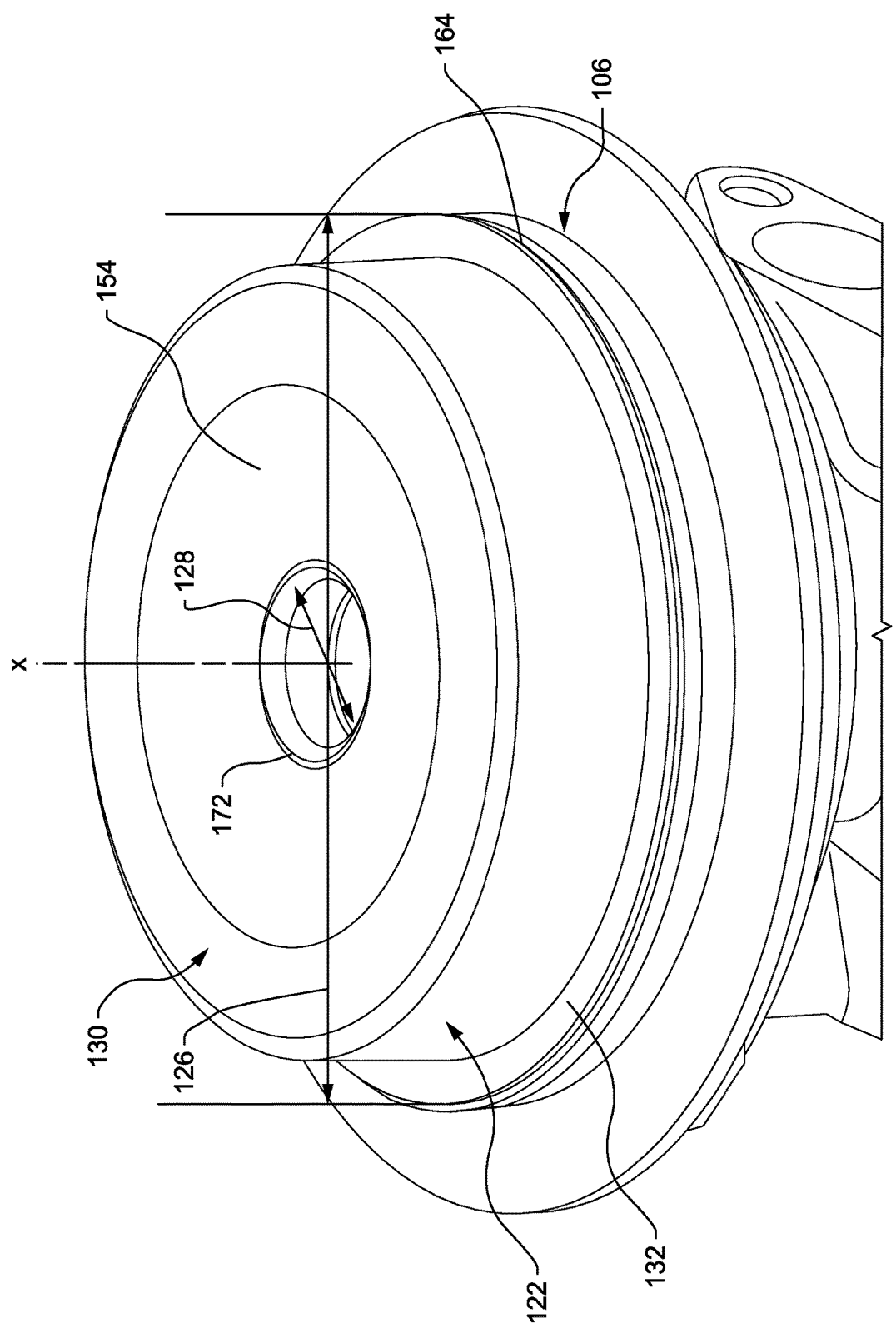
FIG. 11 is a perspective view illustrating the outer wall of the heat shield of FIG. 9 disposed on the bearing housing of FIG. 9.

FIG. 9 illustrates yet another alternative embodiment of the heat shield 100. In the embodiment of FIG. 9 an alternative embodiment of both the outer wall 122 and the inner wall 124 is utilized. The outer wall of FIG. 9 is similar to that of FIG. 1, except that while the flange 132 still extends outward from the first member 130, the flange 132 is not disposed on the rim 142 of the inner wall 124, the flange 132 is not angled away from the rim 142 and is not in contact with the rim 142. Moreover, the outer wall 122 of the embodiment of FIG. 9 is not in contact with the inner wall 124, anywhere in the turbocharger 102. The flange 132 is now sandwiched between the turbine housing 104 and the outer shoulder 164 of the bearing housing 106 (see FIGS. 9-11). The flange 132 is disposed at a level above the rim 142 of the inner wall 124.

The inner wall 124 of FIG. 9 has a second outer diameter 136 that is shorter than the first outer diameter 126 of the outer wall 122. Further the inner wall 124 has a second inner diameter 138 that is shorter than the first inner diameter 128 of the outer wall 122. The inner wall 124 of FIG. 9 is suspended (see FIGS. 9-10) into the chamber 120 in the bearing housing 106. In other words, the rim is not disposed on the bearing housing 106 and is not sandwiched between the outer shoulder 164 of the bearing housing 106 and the flange 132. In this embodiment, the turbine housing 104 may be generally flush to the top of the flange 132. The inner wall 124 of FIG. 9 is mounted on top of and in contact with the inner shoulder 158 of the bearing housing 106.

When installed in the turbocharger 102, the inner wall 124 is spaced apart from the outer wall 122 such that the first and second inner edges 134, 144 form an air gap 146 between them, and the inner wall 124 and the outer wall 122 form a cavity 148 that extends from the second outer edge 152 of the rim 142 to the air gap 146. The air gap 146 is an entrance to the cavity 148. In this embodiment, the cavity 148 and the chamber 120 are fluidly connected. The inner wall 124 is directly adjacent to (or flush with) the bearing housing 106 at the second inner edge 144.

In the embodiment illustrated in FIG. 9, the mounting of the turbine housing 104 on the bearing housing 106, results in a force being applied to the flange 132 by the turbine housing 104. Unlike some of the other embodiments, the flange 132 does not apply a force to the rim 142 of the inner wall 124. The force applied to the flange 132 suspends the flange 132 over the chamber 120 and above the inner wall 124. This force maintains position of the outer wall 122.

In the embodiment of FIG. 9, the flange 132 does not apply an opposing force to the turbine housing 104. The inner wall 124 is held stationary and in the appropriate position in the turbocharger 102 by its mounting to the inner shoulder 158. The mounting means may be any appropriate means known in the art. The mounting of the inner wall 124 places the inner wall 124 in sealing contact with the inner shoulder 158 and seals the chamber 120 near the inner shoulder 158 (it is unsealed near the outer shoulder 164).

Figure 12:
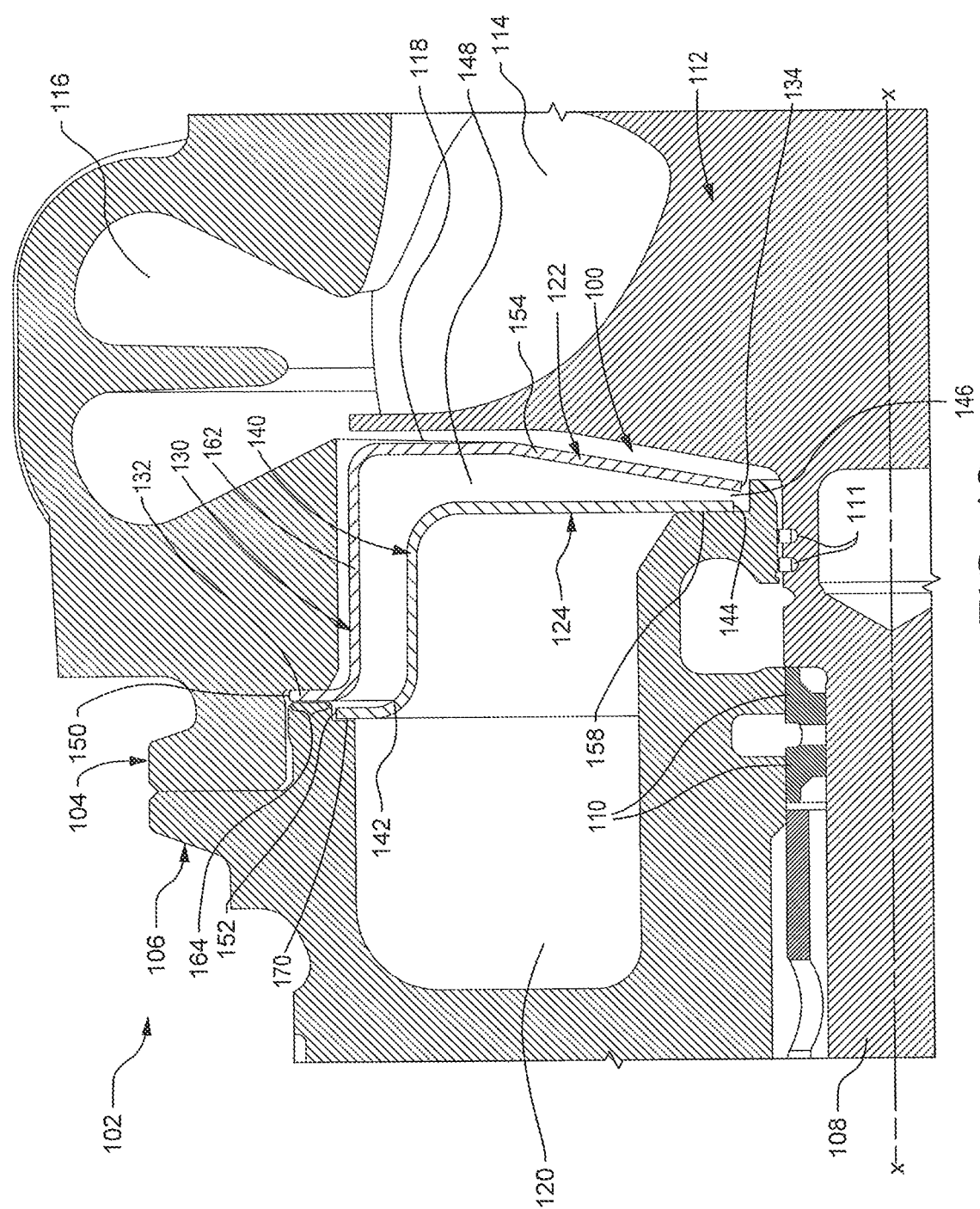
FIG. 12 is a schematic cross sectional view of a portion of another exemplary embodiment of the exhaust-gas turbocharger that includes an alternative embodiment of the heat shield and bearing housing.
Figure 13:
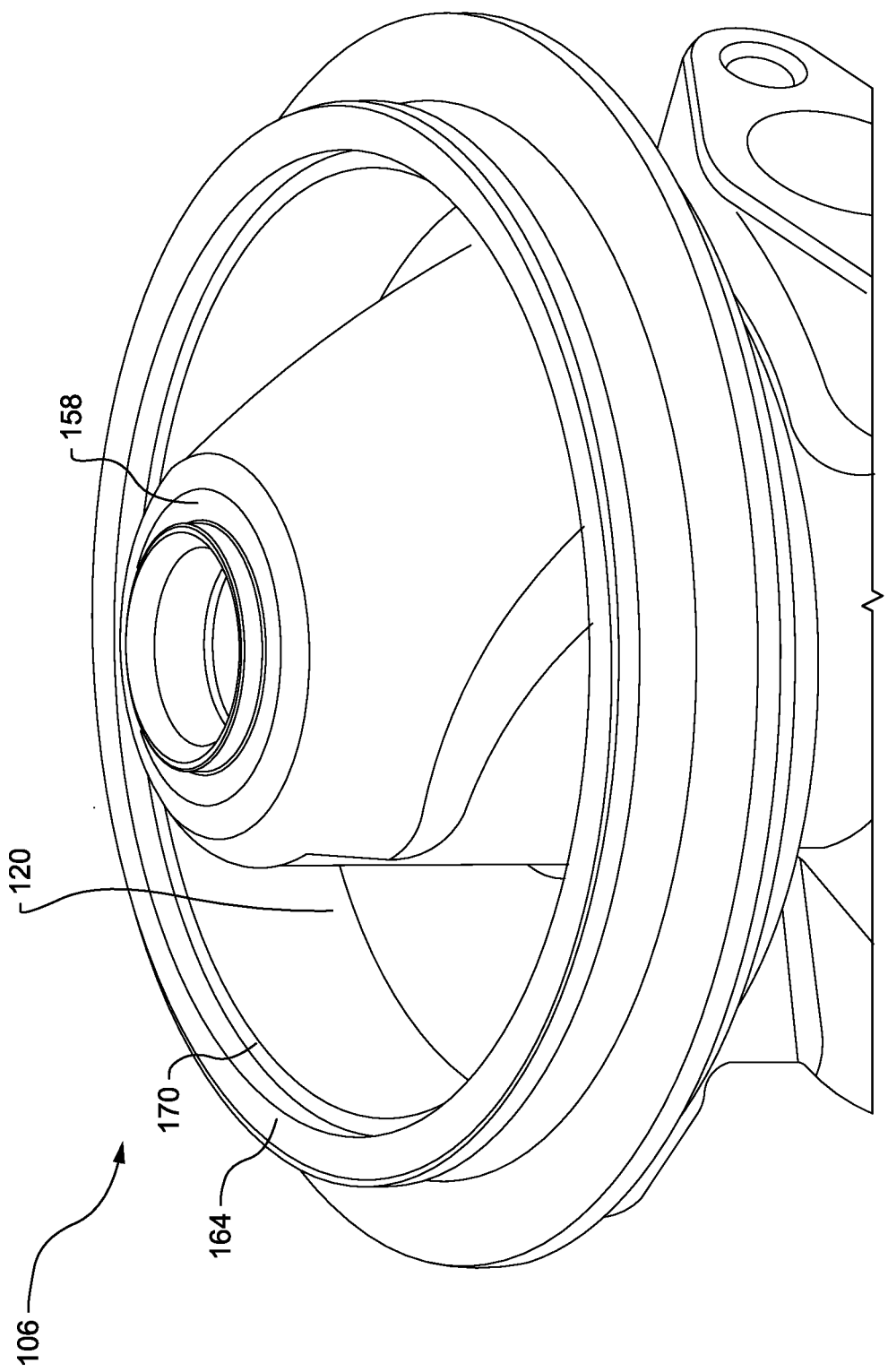
FIG. 13 is a perspective view of the bearing housing of FIG. 12.
Figure 14:
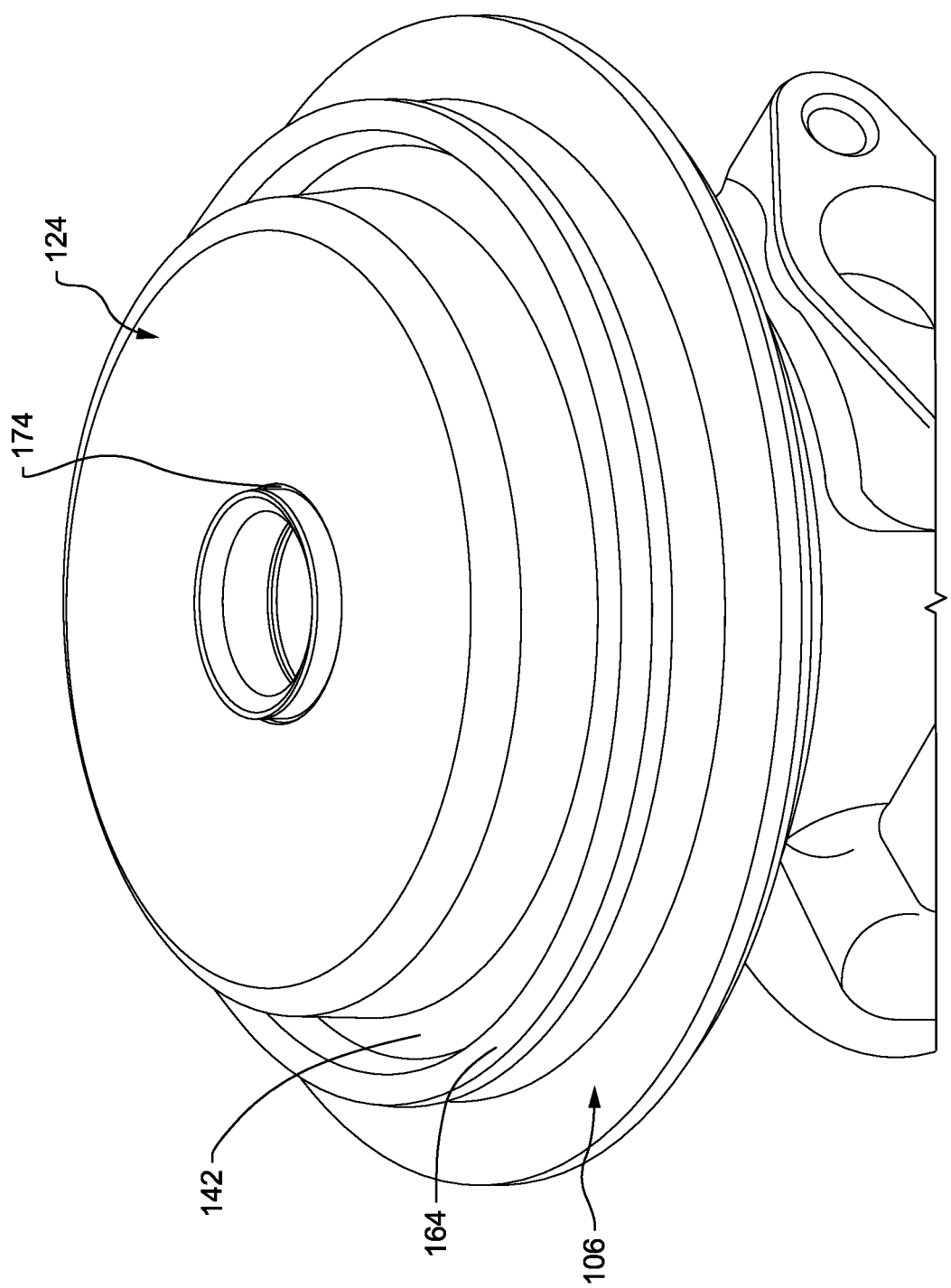
FIG. 14 is a perspective view illustrating the inner wall of the heat shield of FIG. 12 disposed on the bearing housing.
Figure 15:
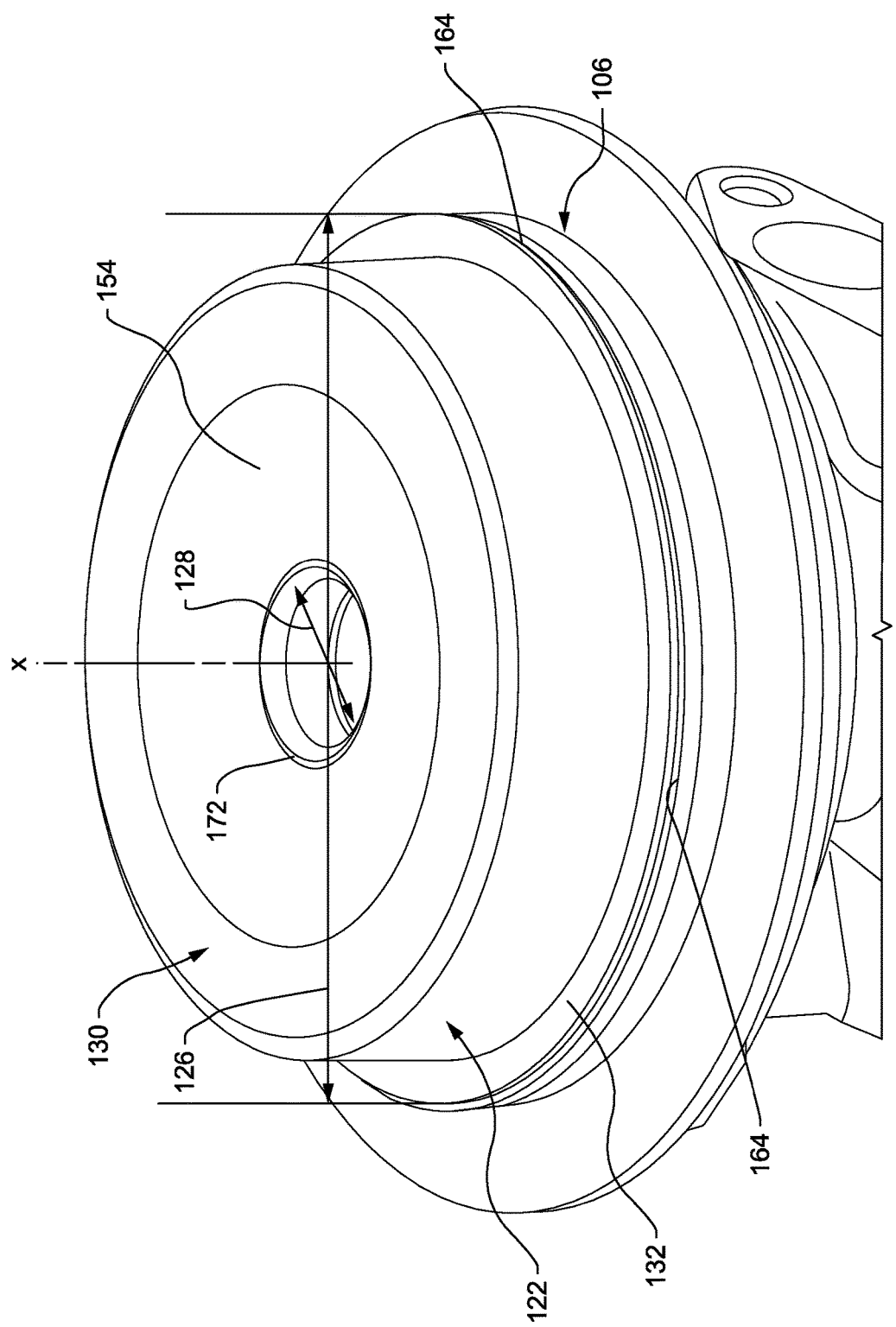
FIG. 15 is a perspective view illustrating the outer wall of the heat shield disposed on the bearing housing of FIG. 12.

FIG. 12 illustrates yet another alternative embodiment of the heat shield 100. The bearing housing 106 of FIG. 12 is the same as that of FIG. 9 except that the bearing housing 106 of FIG. 12 includes ledge 170 below the outer shoulder 164 and inside the bearing housing 106 adjacent to the chamber 120. In some embodiments, the ledge 170 may, in some embodiments, be annular in shape.

The outer wall is the same as that of FIG. 9, and similarly, the flange 132 of FIG. 12 is not disposed on the rim 142 of the inner wall 124 and is not in contact with the rim 142. Also similar to the embodiment of FIG. 9, the outer wall 122 of the embodiment of FIG. 12 is not in contact with the inner wall 124, anywhere in the turbocharger 102. The flange 132 is sandwiched between the turbine housing 104 and the outer shoulder 164 of the bearing housing 106 (see FIG. 12). The flange 132 is disposed at a level above the rim 142 of the inner wall 124.

The inner wall 124 of FIG. 12 is similar to that discussed in the embodiment of FIG. 9 except that the inner wall 124 of FIG. 12 has a second inner diameter 138 that is the same length as the first inner diameter 128 of the outer wall 122, and the rim 142 is disposed on the ledge 170 below the level of the flange 132. The rim 142 of the inner wall 124 of FIG. 12 is not suspended into the chamber 120 in the bearing housing 106 but instead is disposed on top of the ledge 170. The rim 142 may best against the ledge 170 of may be fixedly mounted on the ledge 170. Similar to the embodiment of the turbocharger 102 in FIG. 9, the turbine housing 104 may be generally flush to the top of the flange 132. The inner wall 124 of FIG. 12 is mounted on top of and in contact with the inner shoulder 158 of the bearing housing 106.

When installed in the turbocharger 102, the inner wall 124 is spaced apart from the outer wall 122 such that the first and second inner edges 134, 144 form an air gap 146 between them, and the inner wall 124 and the outer wall 122 form a cavity 148 that extends from the second outer edge 152 of the rim 142 to the air gap 146. The air gap 146 is an entrance to the cavity 148.

In the embodiment illustrated in FIG. 9, the mounting of the turbine housing 104 on the bearing housing 106, results in a force being applied to the flange 132 by the turbine housing 104. the flange 132 does not apply a force to the rim 142 of the inner wall 124. The force applied to the flange 132 suspends the flange 132 over the chamber 120 and above the inner wall 124. This force maintains position of the outer wall 122.

In the embodiment of FIG. 12, the flange 132 does not apply an opposing force to the turbine housing 104. The inner wall 124 is held stationary and in the appropriate position in the turbocharger 102 by its mounting to the inner shoulder 158 and by its resting position and/or by secure mounting on the ledge 170. The inner wall 124 is in sealing contact with the inner shoulder 158 and the ledge 170 and, as such, seals the chamber 120 from receiving exhaust.

Figure 16:
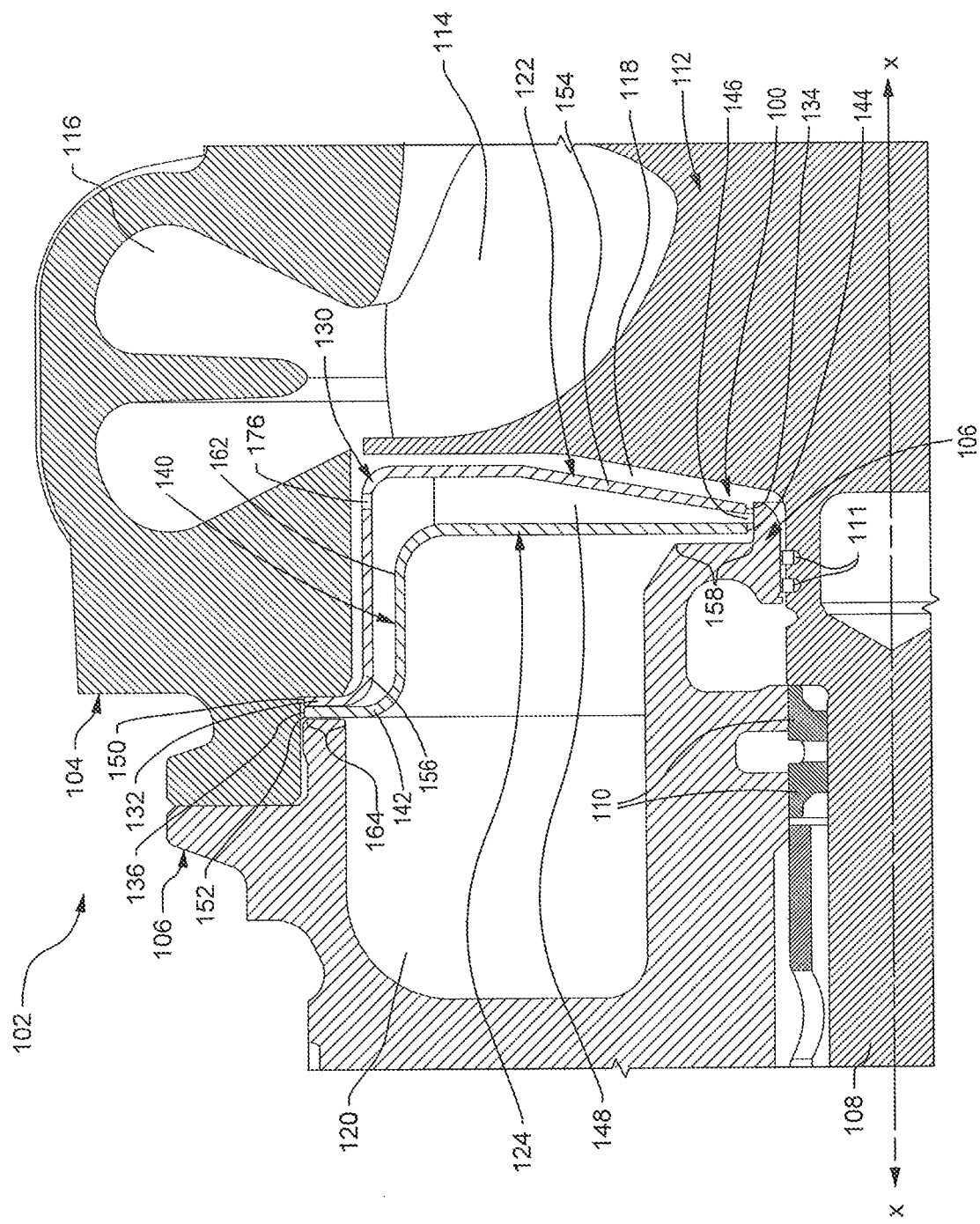
FIG. 16 is a schematic cross sectional view of a portion of one exemplary embodiment of an exhaust-gas turbocharger including a heat shield that has an outer wall that includes vent holes.

FIG. 16 illustrates an alternative embodiment of the heat shield 100. The embodiment shown FIG. 16 is similar to that shown in FIG. 1, except that an alternative embodiment of the outer wall 122 is utilized. The outer wall includes one or more vent holes 176 in the first member 130 (see FIGS. 16-17). Although depicted with respect to the embodiment of FIG. 1, the vent holes 176 may be utilized in any of the other embodiments of the heat shields 100 described above.

Also disclosed is a method of assembling a heat shield 100 in the turbocharger 102, method comprising: positioning the inner wall 124 over the chamber 120 in the bearing housing 106, the inner wall 124 including the second member 140 and the rim 142 extending outward from the second member 140; mounting the outer wall 122 between the bearing housing 106 and the turbine housing 104, the outer wall 122 defining a first aperture 172, the outer wall 122 including a first member 130, a flange 132 extending outward from the first member 130, and a first inner edge 134 adjacent to the first aperture 172, wherein the first member 130 extends from the flange 132 to the first inner edge 134; wherein the outer wall 122 is suspended over the inner wall 124 and the inner wall 124 is spaced apart from the outer wall 122; wherein the inner wall 124 and the outer wall 122 form a cavity 148, wherein further there is an air gap 146 between the inner and outer walls 124, 122 proximal to the first inner edge 134, the air gap 146 an entrance to the cavity 148.

INDUSTRIAL APPLICABILITY

When installed in a turbocharger 102, the heat shield 100 limits heat transfer to the bearing housing 106 from the hot exhaust gases from the inlet 116 and, thus, reduces heat transfer into the bearings 110 and into the compressor. The heat shield 100 disclosed herein decreases heat flux exposure because it, at minimum, reduces heat transfer (to the bearing housing 106) from the exhaust gases in the exhaust channel 118, reduces or eliminates exhaust gas movement behind the inner wall 124 and thus reduces the associated heat transfer, and to the extent that there is any trapped exhaust gas (a "gas dam") in the cavity 148, utilizes such as a heat insulator in the cavity 148 between the outer wall 122 and the inner wall 124 of the heat shield 100.

In operation, exhaust gases from the inlet 116 flow to the blades 114 of the turbine wheel 112 causing the turbine wheel 112 to rotate. Some exhaust gases originating from the inlet 116 may also be present in the exhaust channel 118. Such exhaust gases are very hot, and in some applications, may be in excess of 800° C. The heat shield 100 limits heat transfer to the bearing housing 106.

For example, in the embodiment illustrated in FIG. 1, the exhaust gas may be present in the exhaust channel 118. In the embodiment of FIG. 1 the inner wall 124 is sealed on the outer shoulder 164 by the contact force provided by the outer wall 122 and the turbine housing 104 and bearing housing 106. A very small amount of exhaust gases may enter the cavity 148 via the air gap 146 and may enter the chamber 120 of the bearing housing 106 via the space between the inner shoulder 158 and the inner wall 124. Any exhaust gases inside the cavity 148 and/or the chamber 120 generally do not recirculate and act as a heat insulator.

The embodiments of FIGS. 6-7 and 12 function similarly to that of FIG. 1, except that the chamber 120 is sealed by the inner wall 124 (inner wall 124 disposed on/against the bearing housing 106 and covering the chamber 120). The sealing of this chamber 120 prevents exhaust gases from entering the chamber 120 and transferring heat to the internal walls of the chamber 120 via heat convection. In the embodiments of FIGS. 6-7 and 12, the outer wall 122, any exhaust gas inside the cavity 148, and the inner wall 124 act as insulation and absorb the heat transfer from the hot exhaust gases of the exhaust channel 118, thus limiting the exposure of the bearing housing 106 to such heat.

Similar to the other embodiments, in the embodiment of FIG. 9, the outer wall 122 limits the transfer of heat to the bearing housing 106 from the exhaust gases in the exhaust channel 118, and any exhaust gases present in the cavity 148 provide insulation to further limit heat transfer from the outer wall 122 to the inner wall 124. The inner wall 124 further limits heat transfer from the cavity 148 to the bearing housing 106. In the embodiment of FIG. 9, the inner wall 124 is sealed on the inner shoulder 158 but the rim 142 is suspended into the chamber 120 of the bearing housing 106. As such the cavity 148 is fluidly connected to the chamber 120. This provides a larger space for heat dissipation of any exhaust gas that may be present in these two voids. Any trapped exhaust gas in the cavity 148 and chamber 120 serves as insulation or a buffer to further limit heat transfer from the exhaust gases in the exhaust channel 118 into the bearing housing 106 and bearings 110.

Figure 17:
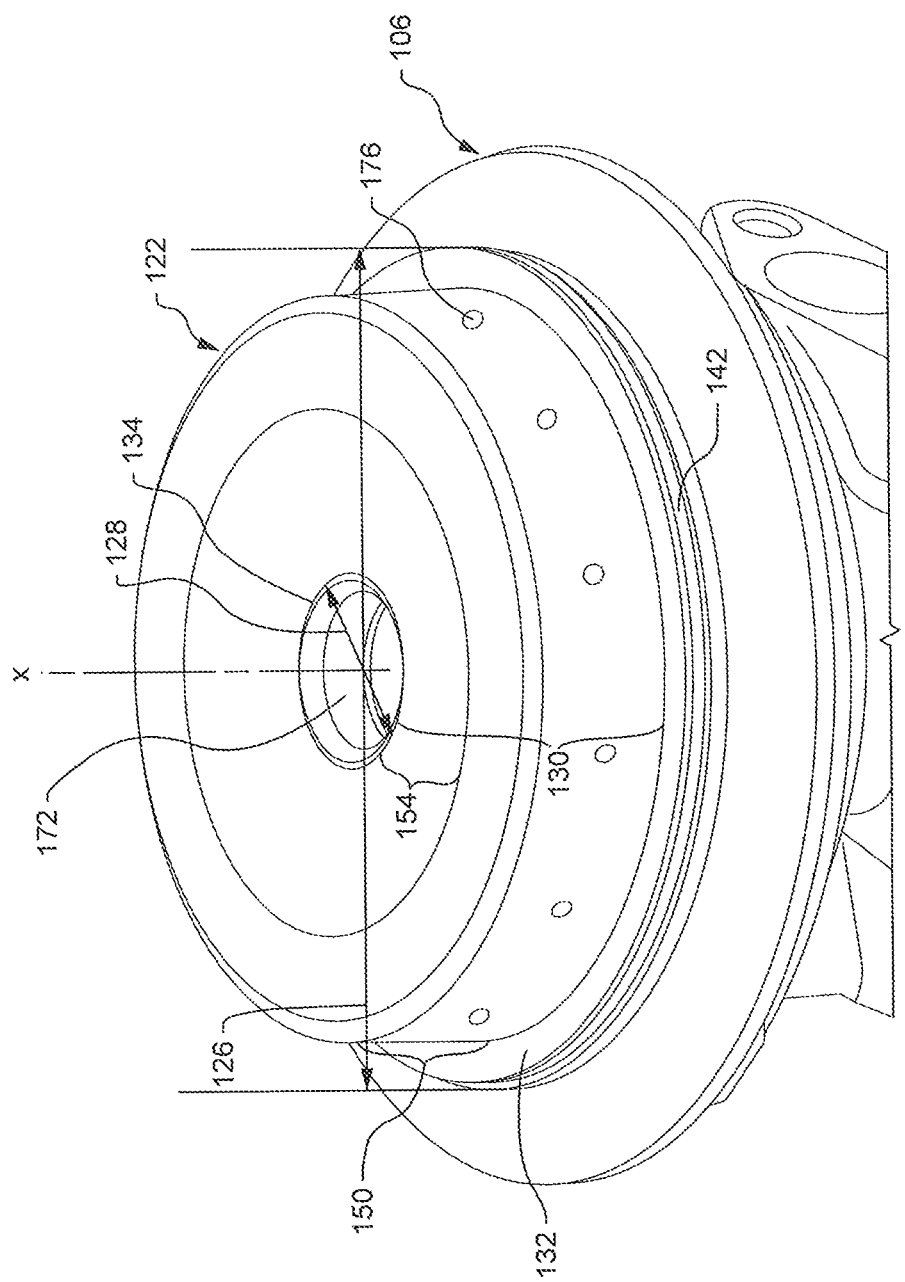
FIG. 17 is a perspective view illustrating one embodiment of an outer wall with vent holes.

FIGS. 16-17 illustrates one possible embodiment in which the outer wall 122 includes one or more vent holes 176. As noted before, a variation of any one of the above embodiments may utilize an outer wall 122 that includes one or more vent holes 176. In embodiments in which the outer wall 122 includes vent holes 176, exhaust gases may flow from the inlet 116 through the vent holes 176 into the cavity 148. The exhaust gases may flow from the cavity 148 into the exhaust channel 118 via the air gap 146. Such gases may then flow through the exhaust channel 118 to the inlet 116 area. While not wishing to be bound by theory, it is believed that this occurs because the vortex of the rotating turbine wheel 112 may create lower pressure near the area proximal to the shaft 108 than at the outer circumference of the turbine wheel 112. The pressure difference may be reduced when the exhaust gases flow between the outer wall 122 and the inner wall 124. It is believed that the reduction in pressure difference (between the area proximal to the shaft 108 and the outer circumference of the turbine wheel 112) that is provided by the cavity 148 may deter or prevent exhaust gases from flowing into the chamber 120 (even when the inner wall 124 is not in sealing contact with the inner shoulder 158) and, in embodiments in which the inner wall 124 is sealed over the cavity 148, may improve the sealing of the chamber 120 of the bearing housing 106 by the inner wall 124.

The features disclosed herein may be particularly beneficial for use with turbochargers 102. The novel embodiments disclosed herein limit the heat flux to which the bearing housing 106 is exposed, thereby helping to maintain the viscosity of bearing lubrication fluid and avoid the wear and tear associated with exposure of the bearings 110, compressor and other components to excessive heat.

What is claimed is:

1. A heat shield comprising:
    an outer wall defining a first aperture about an axis, the outer wall including:
        a first member having a sloped portion proximal to an air gap;
        a flange extending outward from the first member; and
        a first inner edge adjacent to the first aperture,
        wherein the first member extends from the flange to the first inner edge,
        wherein a top surface of the sloped portion forms a side of the exhaust channel; and
    an inner wall defining a second aperture about the axis, the inner wall including:
        a second member;
        a rim extending outward from the second member; and
        a second inner edge adjacent to the second aperture,
        wherein the second member extends from the rim to the second inner edge,
        wherein the bearing housing includes an inner shoulder, an outer shoulder,
        and the chamber is between the inner and the outer shoulders;
    wherein the inner wall is spaced apart from the outer wall and positioned over the chamber, the first, and second inner edges form the air gap between them, the inner wall and the outer wall form a cavity that extends from the rim to the air gap, the air gap is an entrance to the cavity and in fluid communication with the exhaust channel, and the chamber is configured to reduce recirculation of exhaust gas inside of the chamber.

2. The heat shield of claim 1, wherein the flange is disposed on the rim at a contact area, and the flange is configured to apply a contact force on the rim in the contact area.

3. The heat shield of claim 2, wherein the contact force causes the outer wall to be suspended above the inner wall and causes the outer wall and the inner wall to be held stationary within a turbocharger.

4. The heat shield of claim 1, in which the second member includes an inclined portion proximal to the air gap.

5. The heat shield of claim 1, wherein, when installed in a turbocharger, the outer wall does not contact the inner wall.

6. The heat shield of claim 1, wherein outer wall includes a plurality of vent holes.

7. A method of assembling a heat shield in a turbocharger, method comprising:
    positioning an inner wall over a chamber in a bearing housing, the inner wall including a second member and a rim extending outward from the second member, the chamber extending between an inner shoulder and an outer shoulder of the bearing housing; and
    mounting an outer wall between the hearing housing and a turbine housing, the outer-wall defining a first aperture, the outer wall including a first member having a sloped portion proximal to an air gap, a flange extending outward from the first member, and a first inner edge adjacent to the first aperture, wherein the first member extends from the flange to the first inner edge, the top surface of the sloped portion further defining a side of an exhaust channel; wherein:
        the outer wall is suspended over the inner wall and positioned over the chamber;
        the inner wall and the outer wall form a cavity;
        the chamber is between the inner and the outer shoulders and the chamber is configured to reduce recirculation of exhaust gas inside of the chamber;
        the air gap is between the inner and outer walls proximal to the first aperture, the air gap is an entrance to the cavity-; and
        the exhaust channel is in fluid communication with the air gap.

8. The method of claim 7, wherein the inner wall seals the chamber.

9. The method of claim 7, wherein the rim is suspended inside the chamber.

10. A turbocharger comprising:
a turbine housing;
a turbine wheel disposed in the turbine housing and configured to rotate about an axis;
a bearing housing adjacent to the turbine housing, the bearing housing having a chamber extending between an inner shoulder and an outer shoulder of the bearing housing; and
a heat shield disposed between the turbine housing and the hearing housing, the heat shield including:
  an outer wall defining a first aperture about the axis, the outer wall including:
    a first member;
    a flange extending outward from the first member; and
    a first inner edge adjacent to the first aperture, wherein the first member extends from the flange to the first inner edge; and
  an inner wall defining a second aperture about the axis, the inner wall including:
    a second member;
    a rim extending outward from the second member; and
    a second inner edge adjacent to the second aperture, wherein the second member extends from the rim to the second inner edge,
  wherein the inner wall is positioned over the chamber and spaced apart from the outer wall, the first and second Inner edges form an air gap between them, the inner wall and the outer wall form a cavity that extends from the rim to the air gap, the air gap is an entrance to the cavity, the first member having a sloped portion proximal to the air gap and a top surface of the sloped portion forming a side of an exhaust channel, the chamber being configured to reduce recirculation of exhaust gas inside of the chamber, and the exhaust channel is in fluid communication with the air gap.

11. The turbocharger of claim 10, wherein the flange and the rim are sandwiched between the turbine housing and the bearing housing, the flange configured to apply a contact force on the rim.

12. The turbocharger of claim 10, wherein the inner wall is disposed to cover and seal the chamber.

13. The turbocharger of claim 10, wherein the inner wall is in sealing contact with the inner shoulder and the rim is suspended in the chamber.

14. The turbocharger of claim 10, wherein the inner wall is disposed to cover and seal the chamber, wherein the rim is spaced apart from the flange and no portion of the inner wall is in contact with the outer wall.

* * * * *